US006881005B2

(12) United States Patent
Sosa

(10) Patent No.: US 6,881,005 B2
(45) Date of Patent: Apr. 19, 2005

(54) FRAME CONNECTION MECHANISM

(76) Inventor: Saul Siney Sosa, 1042 E. 1380 South, Spanish Fork, UT (US) 84660

( * ) Notice: Subject to any disclaimer, the term of this patent is extended or adjusted under 35 U.S.C. 154(b) by 128 days.

(21) Appl. No.: 09/683,032

(22) Filed: Nov. 9, 2001

(65) Prior Publication Data

US 2002/0044823 A1 Apr. 18, 2002

(51) Int. Cl.$^7$ ................................................ F16B 7/04
(52) U.S. Cl. ...................... 403/395; 403/382; 52/656.9; 52/665; 256/65.05
(58) Field of Search ............................... 403/395, 396, 403/403, 382, 381, 384; 52/656.9, 665; 256/65.05

(56) References Cited

U.S. PATENT DOCUMENTS

| | | | |
|---|---|---|---|
| 3,395,489 A | | 8/1968 | Banse |
| 3,901,613 A | * | 8/1975 | Andersson ................. 52/656.9 |
| 4,527,364 A | * | 7/1985 | Baus ..................... 52/656.9 X |
| 4,628,635 A | | 12/1986 | Maillard |
| 4,793,098 A | | 12/1988 | Wilkerson |
| 4,796,384 A | | 1/1989 | Warwick |
| 4,813,182 A | | 3/1989 | Daniels et al. |
| 5,457,914 A | | 10/1995 | Johnson, Jr. |
| 5,556,080 A | | 9/1996 | Vise |
| 5,702,090 A | | 12/1997 | Edgman |
| 5,716,041 A | | 2/1998 | Groves |
| 5,771,505 A | | 6/1998 | Reynolds |
| 5,868,382 A | | 2/1999 | Groves |
| 6,118,073 A | * | 9/2000 | Lau et al. ............... 403/403 X |
| 6,283,457 B1 | * | 9/2001 | Venegas, Jr. ............. 256/65.05 |
| 6,350,092 B1 | * | 2/2002 | Powell ................... 403/382 X |

FOREIGN PATENT DOCUMENTS

| | | |
|---|---|---|
| EP | 0475743 | 3/1992 |
| EP | 0934757 | 8/1999 |
| WO | WO9523002 | 8/1995 |

* cited by examiner

*Primary Examiner*—John R. Cottingham
(74) *Attorney, Agent, or Firm*—TraskBritt

(57) ABSTRACT

A frame connection structure for use in connecting tubular or open channel elements one to another includes two or more inserts configured for respective insertion within the elements to be interconnected. Each of the inserts defines one or more channels therein, each channel being configured to be aligned with a respective aperture defined within the tubular/open channel element in which it is to be retained. A connection member is positioned within each aperture and its aligned respective insert channel. A portion of the tubular/open channel member proximate the aperture is displaced into the channel of the insert member whereby the that portion of the tubular/open channel member is disposed intermediate the sidewall of the channel and the connection member. The two inserts are configured to be connectable one to another. Each insert is therefore securely associated with a respective tubular/open channel member and the inserts are connectable one to another to facilitate the construction of a frame assembly.

20 Claims, 17 Drawing Sheets

FRAME CONNECTION MECHANISM

BACKGROUND OF INVENTION

1. Field

This invention relates to structures for interconnecting two or more structural elements. More particularly, the invention is directed to structures for interconnecting tubular or open channel elements one to another.

2. State of the Art

Various structures are found by the interconnection of tubular elements in preselected arrangements. The connections of one tubular element to another tubular element present several structural problems. Traditionally, in the instance of tubular elements formed of metal, welding has been a common means of securing one element to another. While welding can produce a strong joint between the elements, in these instances where the joint is exposed to the elements, welded joints are subject to rust and erioration. Should the user wish to undo the connection between the elements, a welded joint can prove difficult to undo. Further, should these tubular elements be galvanized, then galvanized coating must be removed from the joint location in order to facilitate the formation of the welded joint. This removal of galvanized coating subjects the affected areas to the possibility of rusting.

Interconnection structures find various applications in commercial, industrial as well as residential environments. One application of such elements is in the fabrication of gate structures for fencing. Gates typically include a frame structure which is traditionally polygonal in configuration, e.g., rectangular. Gate frame structures may be constructed by joining four or more elongate linear elements to one another at their respective ends to form a polygonally configured structure. If the fencing arrangement in question is constructed of vinyl, the gate frame is oftentimes fabricated of metal tubing and a sheath of vinyl is positioned overtop the frame to render the gate compatible with the remaining structure of the fence. Manufacturers of such gate frames have historically experienced difficulties in joining the various tubular elements together in a way which provides sufficient structural integrity while simultaneously ensuring adequate protection against rust and other forms of erioration from exposure to the elements. Representative efforts in this regard are illustrated in U.S. Pat. No. 5,868,382, U.S. Pat. No. 4,793,098; U.S. Pat. No. 3,395,489; U.S. Pat. No. 4,628,635; U.S. Pat. No. 4,796,384; U.S. Pat. No. 4,813,182; U.S. Pat. No. 5,457,914; U.S. Pat. No. 5,556,080; U.S. Pat. No. 5,702,090; U.S. Pat. No. 5,716,041; and U.S. Pat. No. 5,771,505. While many of these prior constructions address some of the traditional concerns regarding gate constructions, these constructions have yet to meet all of the concerns raised by manufacturers, installers and consumers of such gate products.

FIG. 1 illustrates a conventional interconnection structure. As shown, a first upright A has an extension B welded thereto to extend orthogonally outwardly from the upright A. The extension B is dimensioned to be received within a tubular member D. The tubular member D is dimensioned to be received within a vinyl sheath E. Upon the tubular member D being aligned with the extension B and the sheath E being aligned with the extension B and the tubular member D, the fabricator drills a hole through all three members thereby forming apertures C, H and G. The apertures are dimensioned to receive and retain a rivet F. With the aperture G being aligned with the apertures H and C, the rivet F is inserted through the sheath, tubular member D and the extension B to lock all of the three members into an association one with another.

This particular construction has several problems associated with it. First, to obtain a weld securing the extension B to the upright A is difficult in practice. Further, such a weld is subject to rust. Even assuming that the upright A and the extension B are fabricated from galvanized metal, the galvanizing coating must be removed into order to permit the formation of a welded joint. The removal of the galvanized coating creates the possibility of rust formation. When extensions B are welded to each end of the upright A, the length of upright A is fixed. In many circumstances, the length of the upright A is required to be adjusted for length in the field. The use of welding to affix the extensions B to the upright render such adjustments difficult if not impossible one the weld has been made.

Secondly, the drilling of apertures C, H and G exposes portions of the otherwise galvanized extension and tubular member to rust, i.e. about the edges of the apertures. Further, the use of the extension B requires the sheathing J, which is intended to cover the upright A, to be split longitudinally along its length in order to accommodate the extension B. Furthermore, an opening K must be defined within the sheath J to accommodate the extension B. It follows that not only is sheathing J difficult to manufacture, but furthermore, it is difficult to install.

There continues to exist a need for an interconnection structure and specifically an interconnection structure suitable for gate frame construction which at once provides a high degree of structural integrity and a capacity for length adjustment of the tubular elements in the field while simultaneously providing a high resistance to rust or other forms of erioration resultant from exposure of the interconnection structure to the elements.

SUMMARY OF INVENTION

The instant invention provides a structure for interconnecting two or more tubular elements to one another. The invention includes a first tubular element which defines an internal void therein. The void is accessible through a first port defined by the tubular element. The first tubular element includes a sidewall which defines a first aperture there through which communicates with the internal void. The aperture defines a first aperture diameter.

A first insert element is positioned within the void of the first tubular element. The first insert element defines a first channel therein which is positioned in close coaxial registration with the first aperture of the first tubular element. The first channel defines a diameter which is dimensionally larger than the first aperture diameter. A first connection element is positioned within the first aperture and the first channel to connect the first tubular element to the first insert element. The portion of the first tubular element sidewall proximate the first aperture is bent into the first channel whereby that portion of the first element sidewall is positioned intermediate a sidewall of the first insert element which defines the first channel and the connection element.

The first insert element is associated with an auxiliary connection structure for associating the first insert with a second tubular element. In a preferred construction the auxiliary connection structure includes a second insert element positioned within a void defined within the second tubular element. The second insert element defines a channel therein, hereinafter denominated the second channel which is positioned in a close coaxial registration with an aperture (hereinafter the "second aperture") defined within the second tubular element. The diameter of the second aperture is dimensionally smaller than the diameter of the second channel. A connection member (hereinafter denominated the "second connection member") is positioned within the second aperture and the second channel to retain the second insert element and the second tubular element interconnected to one another. The portion of the second tubular element sidewall proximate the second aperture is bent into the second channel whereby that portion of the second tubular element sidewall is positioned intermediate a sidewall of the second insert element which defines the second channel and the connection element.

The first insert may define a first auxiliary channel therein which preferably defines a plurality of female threads within the auxiliary channel. The second insert element may also define an auxiliary channel therein, hereinafter designated as the second auxiliary channel. A threaded third connection member is threadedly inserted into the second auxiliary channel and the first auxiliary channel. The third connection member functions to releaseably interconnect the two insert elements and as a result the two tubular elements in which the two insert elements are housed.

Alternative constructions of the invention include one embodiment wherein an insert element is configured to be received and retained within three or more tubular elements. The insert is configured to define three or more arms or extension which are individually configured to be received and retained within an internal void or channel of a respective tubular element. In this construction, each arm or extension is configured to define a first channel, said first channel being positioned in close coaxial registration with a respective first aperture defined in a respective tubular element. Each aperture defines a diameter which is dimensionally smaller than a diameter of its respective first channel. A first connection member is positioned within each pairing of a first aperture and a first channel whereby the portion of the tubular member proximate the first aperture is bent into the respective first channel such that that portion is disposed intermediate the first insert member sidewall defining the respective first channel and the respective first connection member.

The various arms on extension may be arranged in a variety of configurations, e.g., "T" shaped, "Y" shaped, "F" shaped, etc. For example, in this alternative embodiment, the first insert element may have a generally "T" shaped configuration, with each of the arms of the "T" being positioned within a respective tubular member and the leg of the "T" being positioned within a third tubular member. This particular embodiment would therefore produce a "T" shaped frame structure. The alternative insert may be an integral structure or may be constituted from two or more inserts which are adapted to interconnect with one another to form a single insert structure.

Further alternative embodiments are within the contemplation of the instant invention. While the positioning of conjoined tubular members may produce orthogonal orientations of the two members relative to one another, such right angle orientations are not required in other arrangements of the interconnection elements and their respective tubular elements. A multiplicity of angled relationships between pairs of tubular members may be produced utilizing the instant connection structure.

The instant invention provides an assembly which can readily be substituted for welded tubing assemblies. The invention is especially useful in those environments where welding is very difficult to perform either due to the size of the structure or the presence of material which is either inflammable or subject to damage from the heat incident to welding, e.g. plastic. The assembly of the present invention is capable of producing joints which have the same strength if not greater strength than the tubing being utilized. Furthermore, in many instances, the newly produced joints may be stronger than welded joints in that the present invention does not weaken the finished structure or create the opportunity for deterioration from environmental hazards.

The nature of the instant invention permits the assembly to be shipped to the consumer in an unassembled condition thereby reducing shipping costs and avoiding damage to the structure in transit. Furthermore, given the specific configuration of the tubing elements, the user is able to adjust the size of the tubing elements on site to construct a structure of a desired dimension.

DETAILED DESCRIPTION

The instant invention is illustrated in the appended drawings in the context of a gate frame for use with vinyl fencing. It should be appreciated that the invention may be utilized in many environments and is not restricted to use in the context of such a gate frame.

Figure 1:
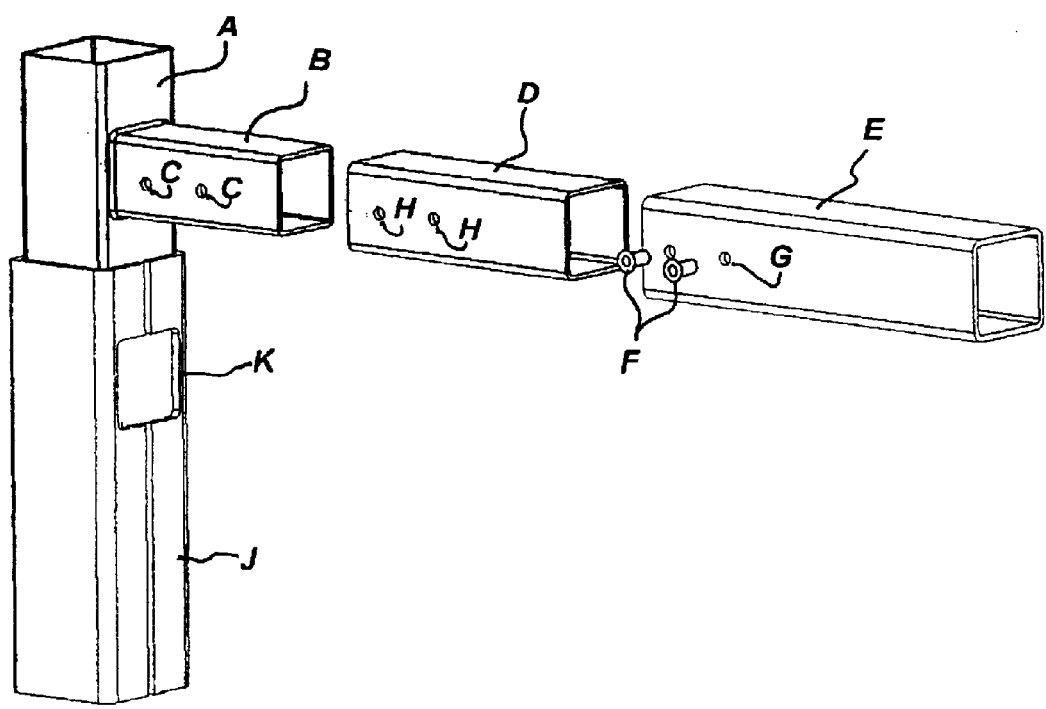
FIG. 1 is an elevated perspective view of a prior art frame connection structure.
Figure 2:
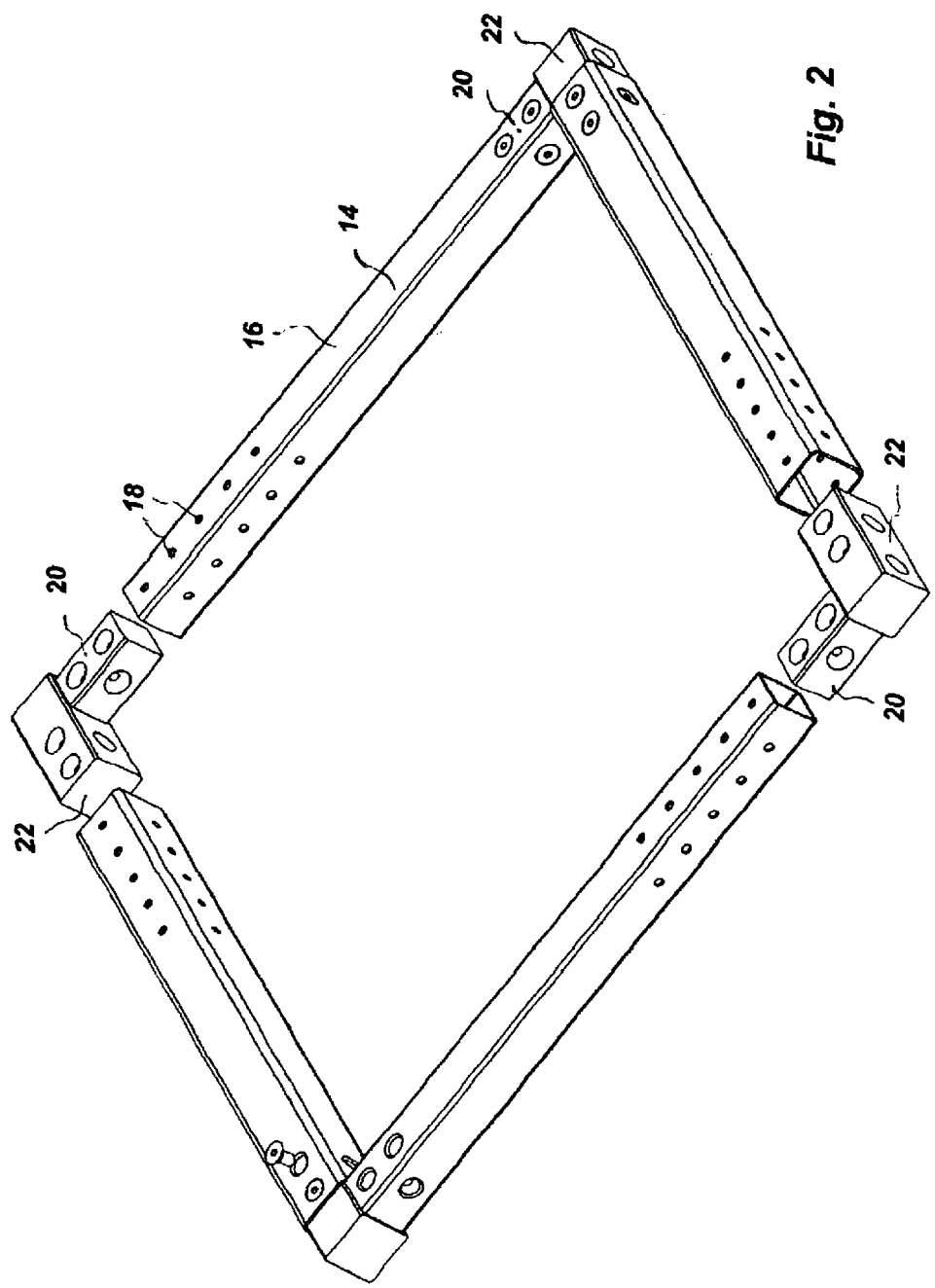
FIG. 2 is an elevated perspective view of a frame assembly incorporating tubular elements in association with connection inserts of the invention.

FIG. 2 illustrates a gate frame assembly formed of the association of four tubular elements 16. Each of the tubular elements 16 are joined to two further tubular elements 16 at its respective ends. Each pair of tubular elements 16 are joined to one another by means of insert members 20 and 22.

Figure 6:
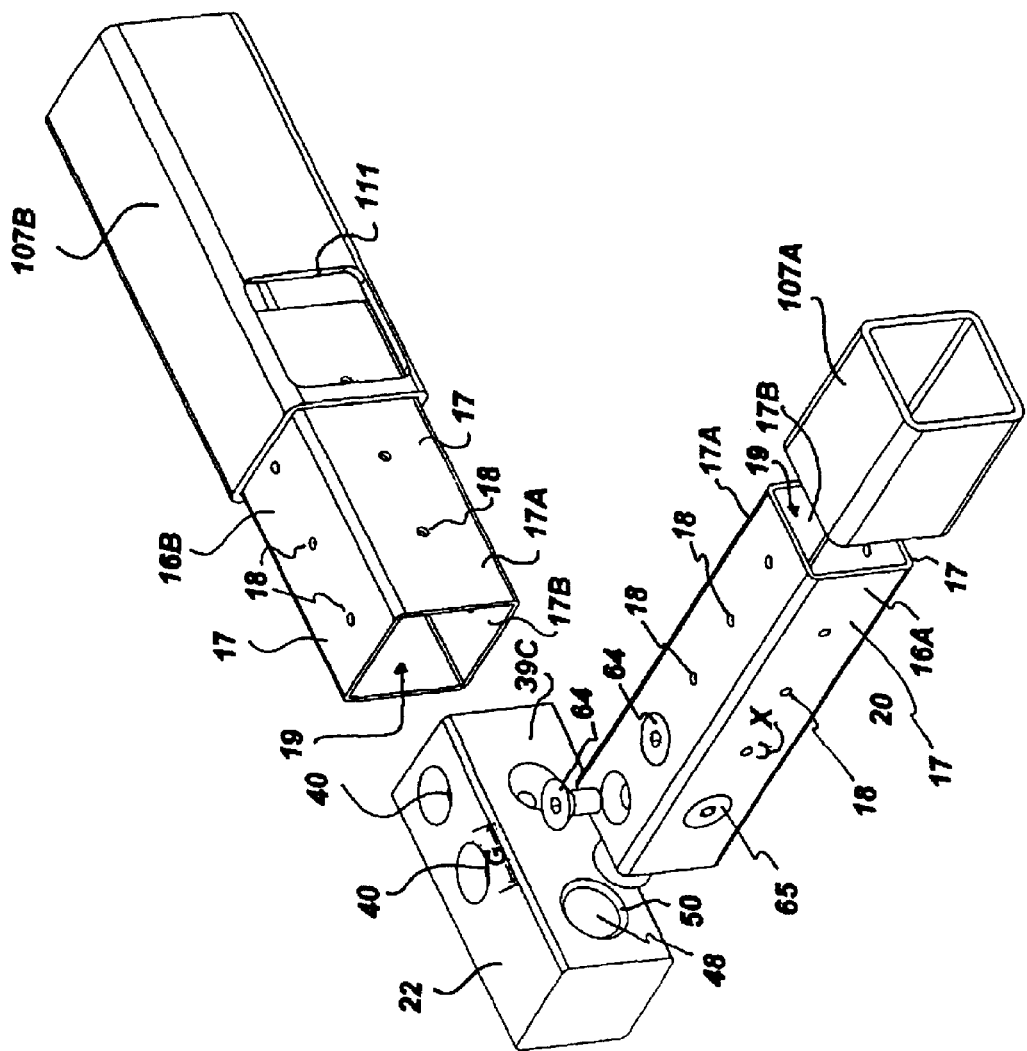
FIG. 6 is a perspective view of two inserts in association with their respective tubular elements.
Figure 6A:
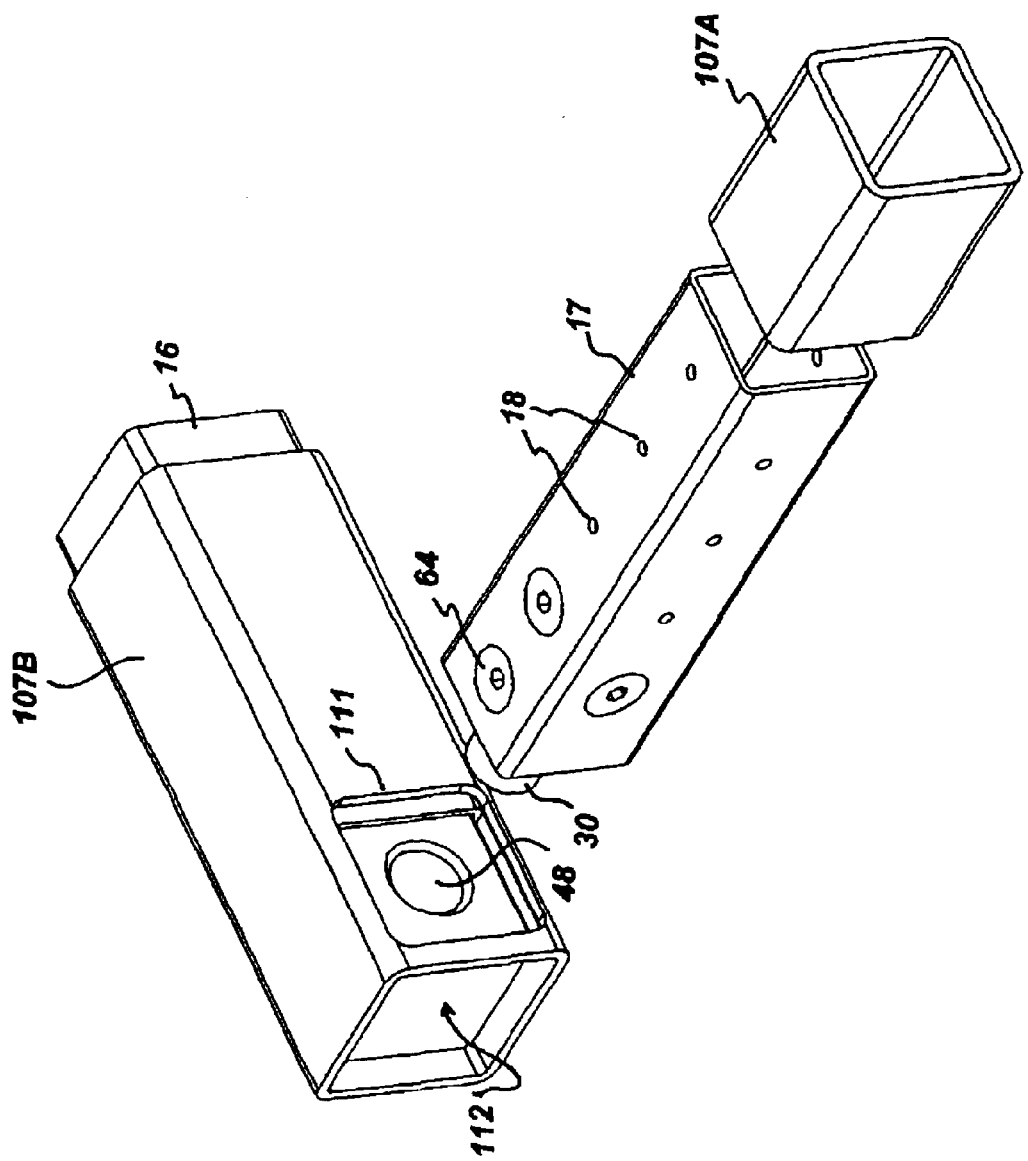
FIG. 6A is a perspective view of the two inserts of FIG. 6 with a first plastic sheath element in a fully installed condition.
Figure 6B:
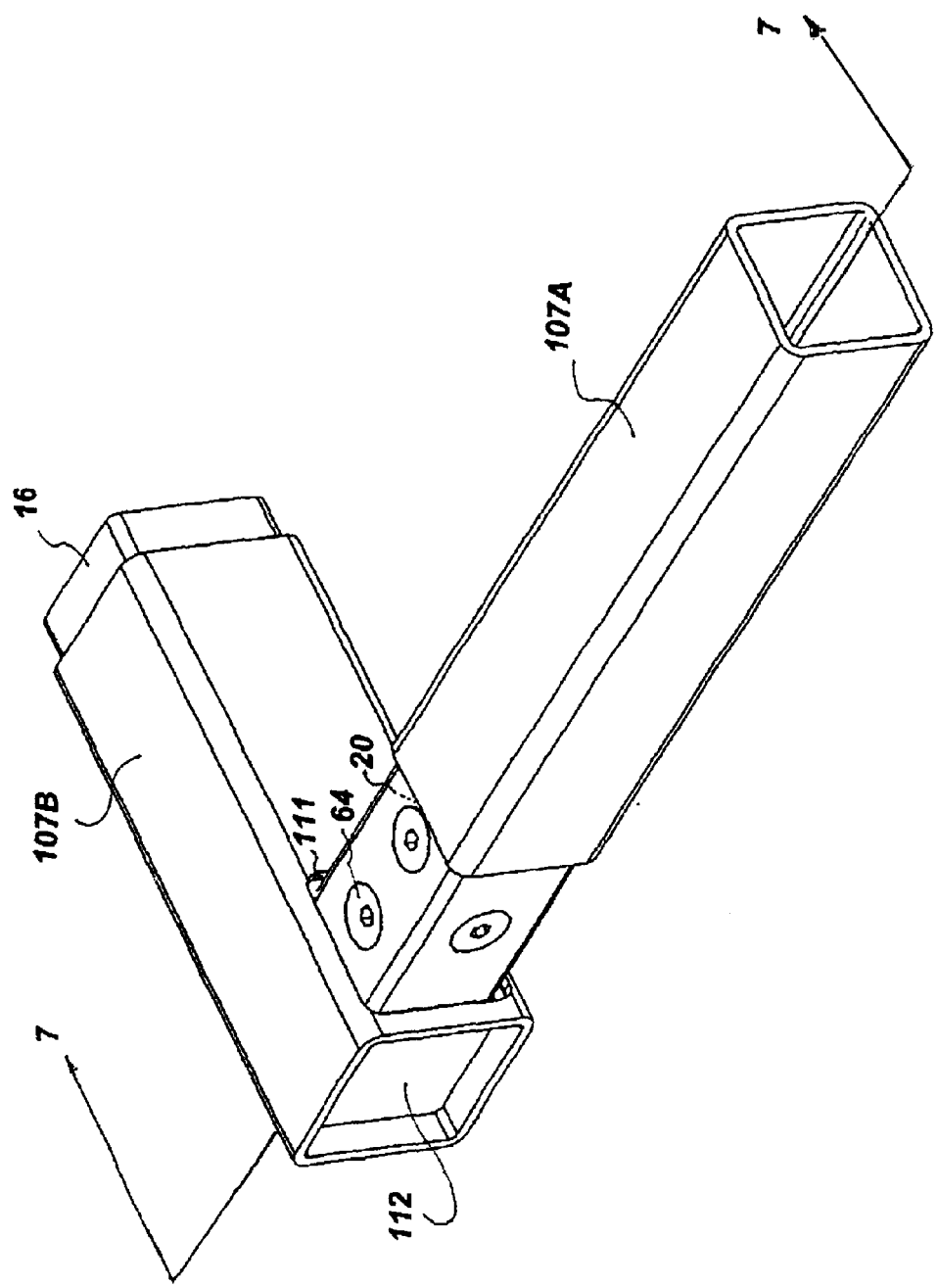
FIG. 6B is a perspective view of the two inserts of FIG. 6 with a second plastic sheath element in a partially installed condition.

As shown to advantage in FIG. 6 tubular elements 16A and 16B are elongate, hollow members having a quadrilaterally configured cross-sections. Each tubular member 16 is formed of four planar panels 17 which form the sidewalls of the tubular member. Each of the planar panels are joined to an adjacently positioned planar panel along its longitudinal edge. Each panel defines an outwardly facing sidewall surface 17A and an inwardly facing sidewall surface 17B. The association of the inwardly facing sidewall surfaces 17B defines a quadrilaterally configured interior channel 19 which extends through the complete length of the tubular member 16.

One or more of the planar panels 17 define apertures 18 which extend through the complete thickness of the panel and thereby communicate the environment with the interior channel 19. Each of these apertures 18 defines a diameter "X." The apertures 18 are shown arranged in linear arrays along a preselected length of one or more surfaces 17 of each tubular member 16. The apertures 18 are arranged to extend along a preselected length of each tubular element thereby permitting the user to adjust the length of a particular tubular element to fit the particular need at hand. Subsequent to cutting the tubular element to the desired length the user is able to utilize the apertures proximate the newly cut end of the tubular element to effect a connection with an appropriate insert and thereafter form an interconnection with a second tubular element positioned proximate thereto. In preferred constructions each of the apertures 18 is circular in configuration. It should be appreciated that apertures 18 of alternative shapes, e.g., oval or quadrilateral, may be utilized in the invention.

Figure 3:
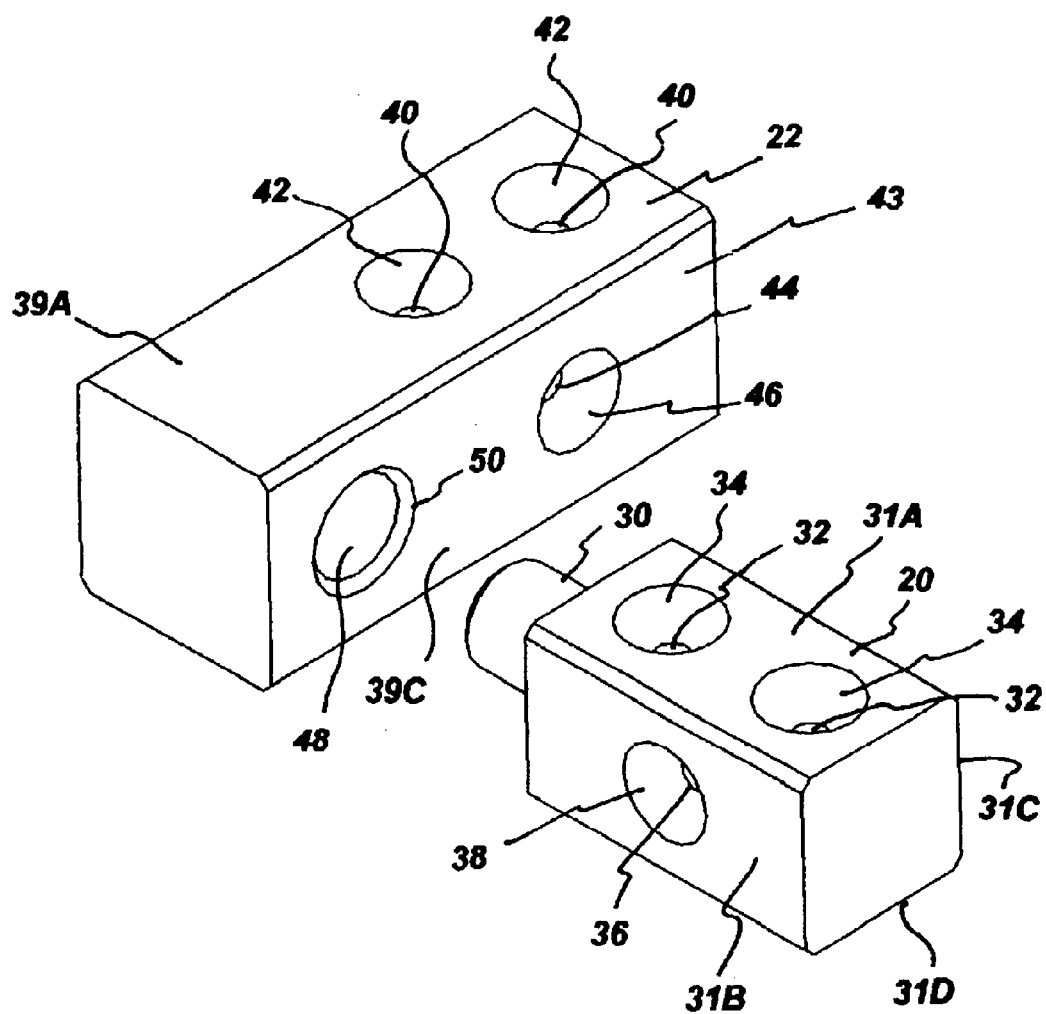
FIG. 3 is an exploded perspective view of two inserts of the invention.

FIG. 3 illustrates two insert elements which may be utilized to join a pair of tubular elements 16 together. As illustrated, a first insert element 20 is an elongate solid member having a generally quadrilaterally configured cross section. Although the insert is illustrated as a solid member, it should be appreciated that the member could be fabricated as a hollow member or a web type structure defining a hollow interior region. The principal requirement of the insert is to present an outer surface which may engage the internal sidewall of the channel 19 sufficient to preclude unacceptable lateral displacement of the insert within the channel and furthermore, the insert must provide sufficient structure to engage and retain connection members which pass through the tubular element 16 and into the insert.

The cross section of the insert 20 is configured to be inserted within the interior channel 19 of the tubular element 16. It follows that the cross section of the insert 20 is configurational similar to the cross section of the channel 19 but somewhat dimensionally smaller. It follows that for tubular elements having a circular cross section, the insert would be cylindrical in configuration, i.e. the insert would have a circular cross section. Other examples of cross sectional configurations would include triangular, rectangular, etc. The first insert element may be fabricated from a variety of materials or combination of materials. The insert element 20 defines four elongate side faces 31A, 31B, 31C, and 31D. Each side face is generally planar and quadrilateral in configuration. The cross section of the insert 20 is dimensioned to be slideably received within a corresponding tubular member 16, i.e., the insert is configured to be received within the interior channel 19 of the tubular member.

The insert 20 further defines a number of elongate cylindrically configured channels which extend from the exterior surface of the insert element into the body of that element. As shown in FIG. 3, two channels 32 extend from the surface of side face 31A of insert 20 into the body of the insert. Each channel 32 includes a countersink portion 34 which is positioned at the interface of the channel 32 with the side face 31A. The countersink portion of the channel is generally funnel-shaped in configuration, i.e., the countersink defines a generally circular perimeter at the surface of the insert having a first diameter "Y." (See FIG. 7) As the channel descends into the body of the insert, the diameter decreases at a linear rate until eventually reaching a second diameter "Z."0 Once the channel reaches the diameter Z, the channel preferably retains a constant diameter for the remainder of the channel's length. The configuration of a channel 32 is shown to advantage in FIG. 7. The channel 32 is generally symmetric about a longitudinal axis 33.

The insert 20 may also define one or more apertures 36 in one or more of the upstanding side faces 31B and 31C. As further shown in FIG. 3, a channel 36 is shown extending from the surface 31B into the interior of the insert 20. The channel 36 also includes a countersunk portion 38 which is configured similarly to countersink 34. The bottom surface 31D may also be configured to define channels of a configuration similar to channels 32.

Figure 7:
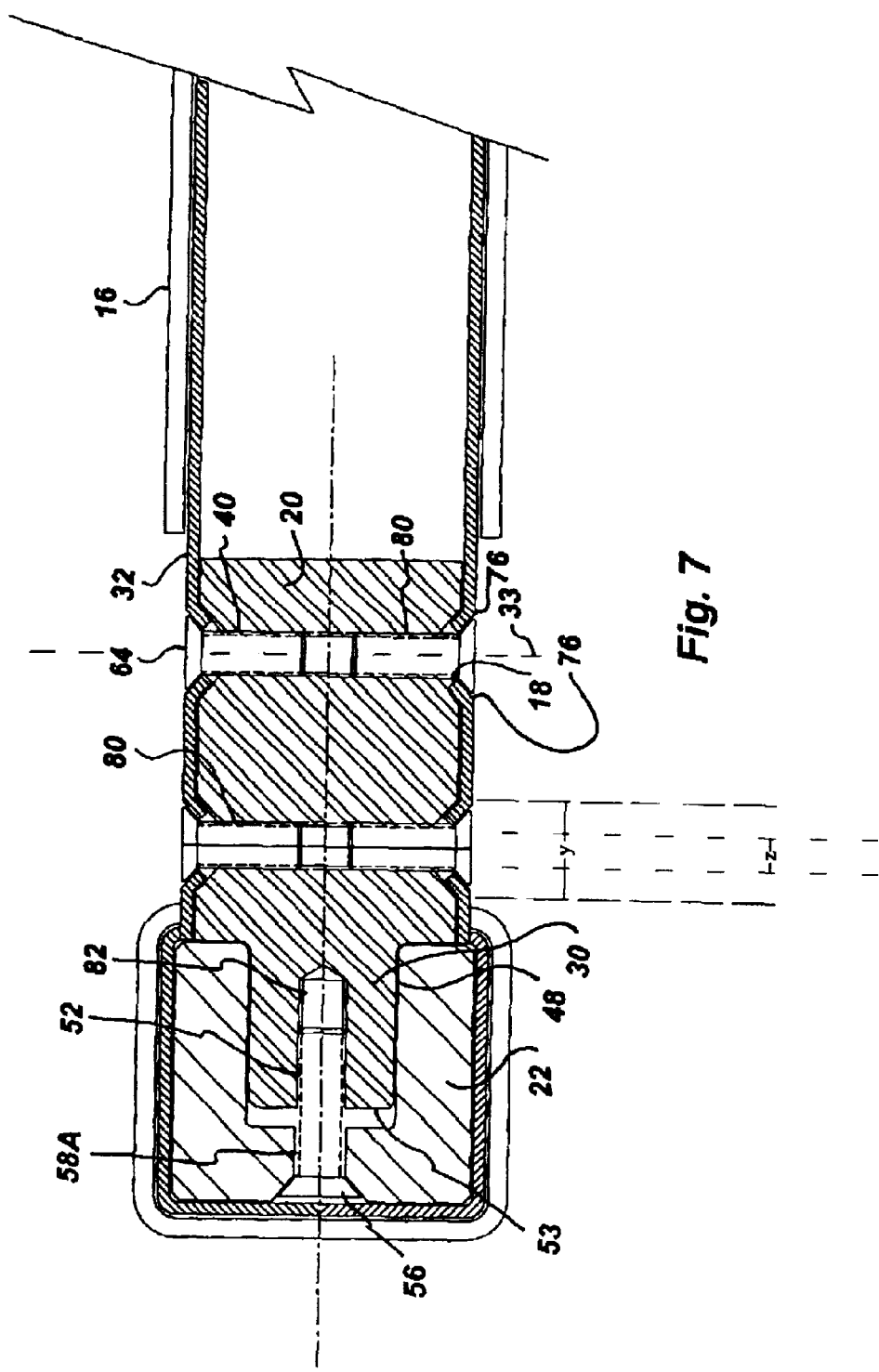
FIG. 7 is a partial cross sectional view of FIG. 6B taken along section line 7—7.

The channels 32 and 36 may be tapped i.e. the channels may include a series of preformed female threads along their sidewalls dimensioned to threadedly receive and retain the male threads of a connection member 64 (see FIG. 7). In alternative constructions, the connection member 64 may be a self-threading screw which forms female threads on the interior sidewalls of the channels as it is inserted into such channels.

Figure 4:
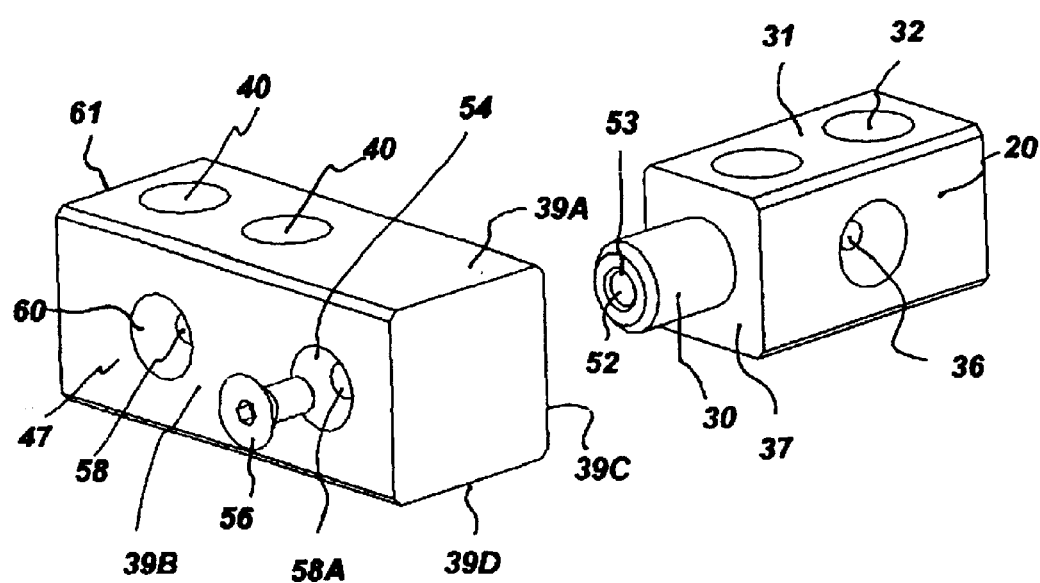
FIG. 4 is another exploded perspective view of the inserts of FIG. 3.
Figure 5:
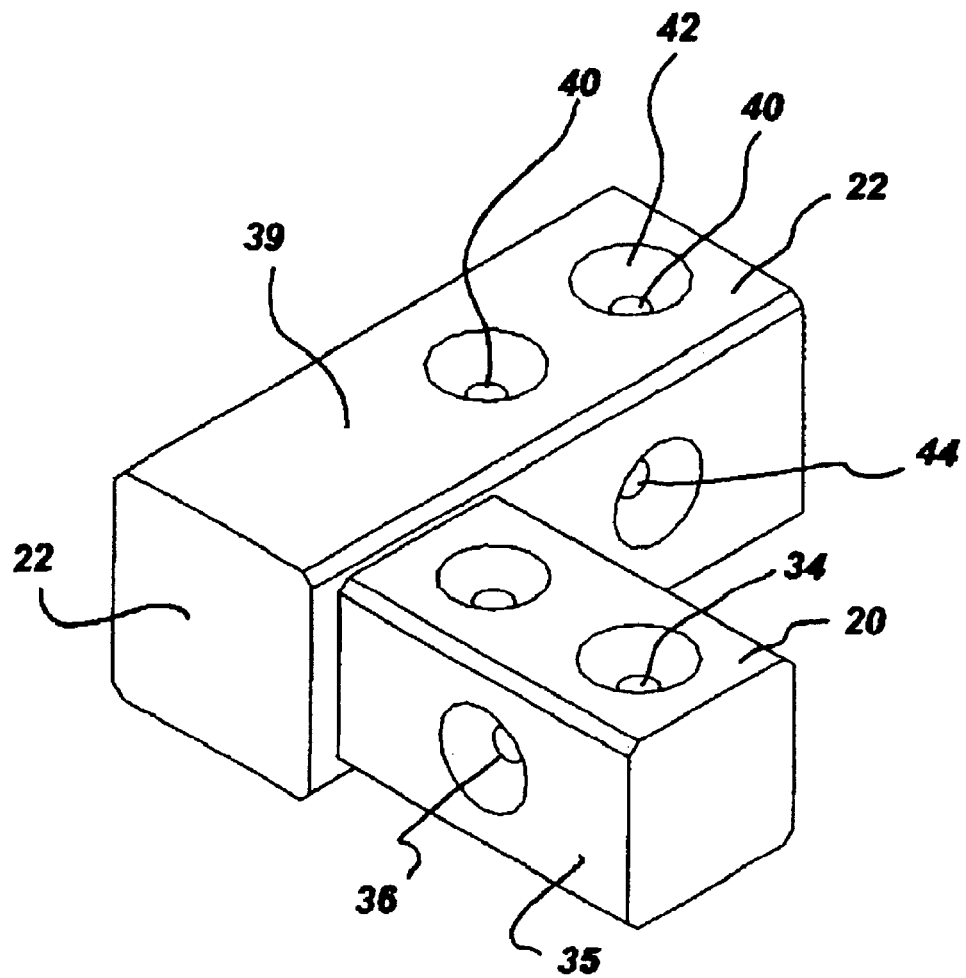
FIG. 5 is a perspective view of the inserts of FIG. 3 joined together.

The insert 20 includes a cylindrically configured extension 30 which extends outwardly from one of the end faces 37 of the insert (FIG. 4). In preferred constructions the extension 30 has a constant diameter over its length. In alternative constructions the extension may be tapered over its length. Furthermore, the extension may be configured to have a variety of cross sections., e.g. circular, oblong, quadrilateral, triangular. The surface of the extension may be smooth or knurled to permit more manufacturing tolerance and to be facilitate a press fit of the extension into its receiving channel 48. As shown in FIG. 4, the end 53 of extension 30 defines a channel 52 having a circular cross section. The channel 52 extends from the end surface 53 of the extension 30 into the body of the extension. In preferred constructions, the channel 52 is a linearly configured channel having a constant diameter over its length. The interior sidewalls of the channel 52 may be fitted with female threads dimensioned to intercorporate with the male threads of a connection member 56. Alternatively, the connection member 56 may be a self tapping screw which forms threads within the sidewall of the channel 52 upon its insertion into the channel 52 or alternatively a conventionally tapered screw. The insert 20 is preferably fabricated from a material having sufficient structural integrity to resist the forces that are applied to the tubular elements 16 during use. In those environments where the insert will be exposed to the environment during use, it is further preferred that the insert 20 be fabricated from a material which is resistant to deterioration as a result of exposure to such elements. Presently, metal, synthetic materials such as plastic and similar materials are contemplated for use in manufacturing the insert 20. Material may have a coating such as paint, zinc, galvanization, etc.

In the illustrated embodiment, the insert 20 is shown as a solid member. It should be appreciated that alternative constructions of this element are within the contemplation of the invention. For example, the insert could be manufactured in the form of a web which defines the required channels and is a thick resistant sheet or plate.

A second insert element 22 (FIG. 3) has many structural characteristics which are similar to those of the first insert element 20. Specifically, the second insert 22 defines a generally quadrilaterally shaped cross section. The second insert has four planar sides which are also quadrilateral in configuration. The second insert also has planar, quadrilaterally configured ends. The upper side surface 39A defines two channels 40 which extend from the surface 39A into the body of the second insert. As shown in FIG. 6 each of the channels 40 includes a countersunk portion which defines a maximum diameter having a dimension G. (See FIG. 6)

Similar to the channels 36 described above, the channels 40 have a funnel shaped countersunk region which leads to a cylindrically shaped remaining region. In most instances, as with channels 36, the channels 40 do not extend completely through the thickness of the insert 22, instead the channels 40 extend only partially through the thickness of the insert 22. Further, the channels 40 may also include a plurality of female threads disposed on the interior sidewalls of the channels. The female threads are configured to intercorporate with the male threads of a respective connection member 64 which may be inserted into the channel 40. Similar to insert 20, the second insert 22 may also define channels 58 on the upstanding side face 39B as well as upstanding side face 39C. These channels 58 are substantially identical in configuration to the channels 40.

The side face 39C may also define a channel 48 which extends inward from the surface 39C into the body of the insert 22. This channel 48 may include a small countersunk region 50, although other embodiments of the insert may not include such a countersunk region. The channel 48 is dimensioned to slidably receive and retain the extension 30 of the first insert to form a secure union with that extension. The channel 48 is positioned in coaxial registration with a channel 58A defined in the upstanding surface 39B. The channel 58A communicates with the channel 48 whereby a threaded connection member 56 may be inserted into the channel 58A from the side 39B and thereafter be directed into the channel 52 defined in the end of extension 30. As shown to advantage in FIG. 7, the channel 48 is dimensioned to have a length greater than the longitudinal length of the extension 30 such that when the extension is fully received within the channel 48, a small void 84 of channel 48 remains unoccupied. Similarly, the channel 58A in association with the channel 52 is dimensioned to have a length which is dimensionally longer than the length of the shaft of the connection member 56 whereby upon a full insertion of the shaft of the connection member 56 into the channel 58A and channel 52, a void 82 in the channel 52 remains unoccupied.

The structure of the first insert and the second insert together with the connection member 56, permits the two inserts to be fixedly associated one with another by first inserting the extension 30 into the channel 48. The connection member 56 is then inserted into the channel 58A and subsequently into the channel 52 of the extension 30. The connection member 56 is threadingly inserted into the channel 52 thereby drawing the extension 30 further into the channel 48 until the endwall 37 of the extension 30 is brought into abutment with the upstanding sidewall 39C of second insert 22. Given the configuration of the channels 58A and 48, the connection member 56 may be utilized to produce a tight union of the two inserts.

Similar to the first insert 20, the end 61 of the second insert 22 is dimensioned to be slidably receive and retained within the hollow interior channel 19 of the second tubular element 16B.

The two inserts 20 and 22 are inserted into their respective tubular elements 16A and 16B sufficiently to align one or more of the channels 32, 36, 40 and 58 with a respective aperture 18 defined in the tubular element. It should be appreciated that the apertures 18 are preferably spacedly positioned along the length of their respective tubular elements 16, (preferably linearly) to have the same distance center to center as the center to center distance separating the respective channels 32, 36, 40 and 58. When the channel 32, 36, 40 or 58 is in aligned registration, e.g., coaxial alignment, with a respective aperture 18, a male threaded connection member 64 may be inserted through the aperture 18 and into the channel 32, 36, 40 or 58.

The diameter of each aperture 18 is dimensionally smaller than the diameter of its respective paired channel 32, 36, 40 or 58. For example an aperture 18 having a diameter of 0.125 inches may be paired with a channel 32 having a diameter of 0.250 inches. It should be appreciated that the diameter of the channels 32, 36, 40 or 58 generally include a countersunk region having a large diameter at one end of the countersunk region and a smaller diameter on the opposing end of the countersunk region. It follows that in the example set forth above, the large diameter of the countersunk region may be 0.250 inches while the smaller diameter of the countersunk region may be approximately 0.125 inches, i.e. the smaller diameter of the countersunk region and as well the diameter of the cylindrical remaining portion of the channel 32, 36, 40 or 58 may be substantially identical in dimension to the diameter of the corresponding aperture 18.

The sidewall of the tubular element 16 is fabricated to be sufficiently malleable that upon the threaded insertion of the flat headed connection member 64 or 65 into the channel 32, 36, 40 or 58 the sidewall portion positioned about the perimeter of the aperture 18 is displaced, i.e., bent, downward into the countersunk region of the respective channel by the tapered portion of the bottom region of the head of the connection member 64 or 65. As noted above, each of the channels 32, 36, 40 and 58 have a respective countersunk region. Furthermore, the connection member 64 or 65 preferably has a tapered head as shown in FIG. 7.

As the connection member 64 or 65 is fully inserted into the channel 32, 36, 40 or 58 the displaced or bent portion of the sidewall of the tubular element is positioned intermediate the sidewall of the channel 32, 36, 40 or 58 and the connection member 64 or 65. With the portion of the tubular element sidewall proximate the aperture 18 being sandwiched between the connection member 64 or 65 and the sidewall of the channel 32, 36, 40 or 58, the tubular element is essentially locked into an association with the insert element which defines the channel. This association of the tubular element with the insert precludes the tubular element from separating from the insert element or alternatively rotating about the insert.

In a prototype embodiment of the invention it was determined that for an aperture 18 of 1/4NC and utilizing a flat Allen head countersunk screw dimensioned to be received within that aperture, a steel tubular element having a sidewall thickness of up to 0.075 inches facilitated that portion of the sidewall proximate the aperture 18 to be bent into the countersunk region of the counterpart channel consistent with the details of the instant invention with a manual application of force to that screw by means of a conventional Allen wrench.

The instant invention by virtue of the above described union of the inserts with their respective tubular elements and the further union of the two inserts one to another, provides a very convenient means for constructing a frame structure from a collection of tubular elements and insert elements. It follows that the frame structure illustrated in FIG. 2 could be easily constructed by inserting inserts 20 and 22 into respective ends of tubular elements 16 and thereafter securing those inserts to their respective tubular elements by means of connection members 64 or 65. Subsequently, the inserts 20 are individually united with their respective inserts 22 by the insertion of the extensions 30 into their counterpart channels 48. Thereafter, the connection members 56 are inserted into their respective channels 58A and 48 so as to fixedly interconnect the two inserts together.

Figure 8:
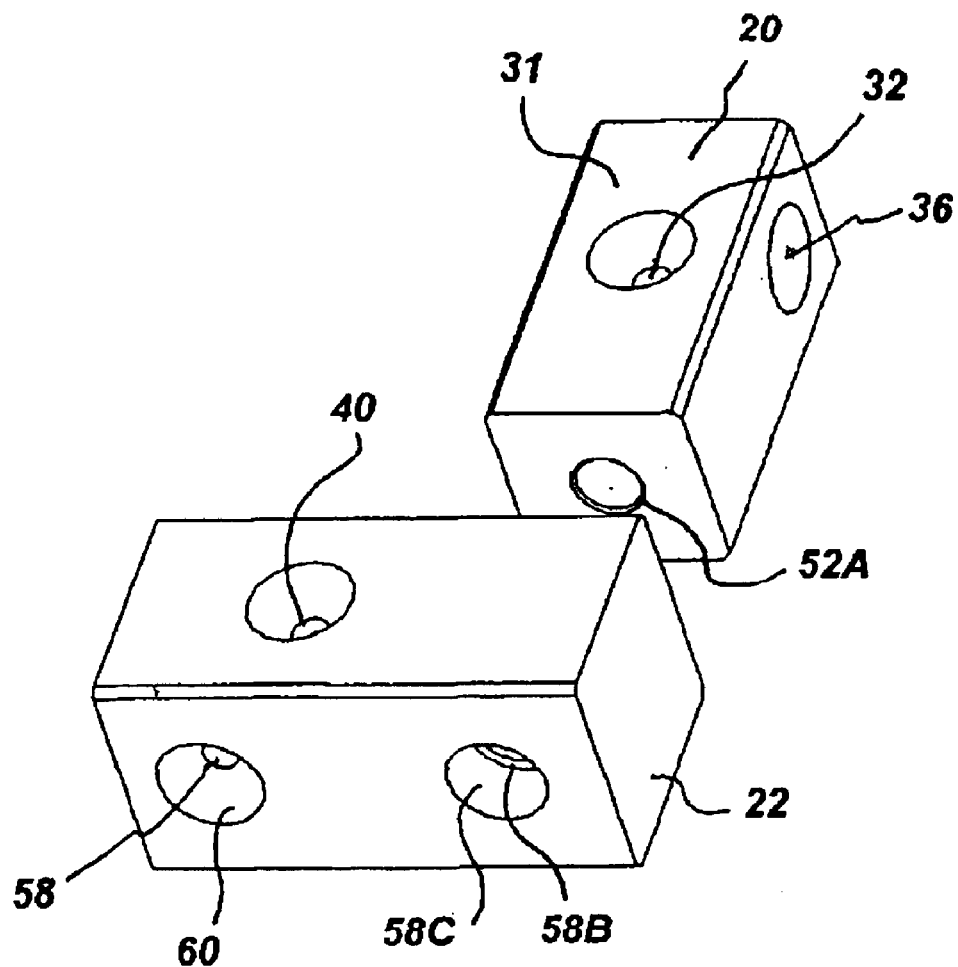
FIG. 8 is a perspective view of a second embodiment of the inserts of the invention.

FIG. 8 illustrates an alternative first insert construction wherein the insert does not include an extension member 30. Instead, the endwall 37 defines the entry of a channel 52A which extends into the body of the insert 20. In this embodiment, the counterpart channel 58B extends completely through the body of the second insert 22. Furthermore, that portion of the channel 58 which extends beyond the countersink 58C is of a constant diameter over the length of the channel. The structure and operation of the second embodiment are essentially identical to the previously described embodiment except for the above described differences.

Figure 12:
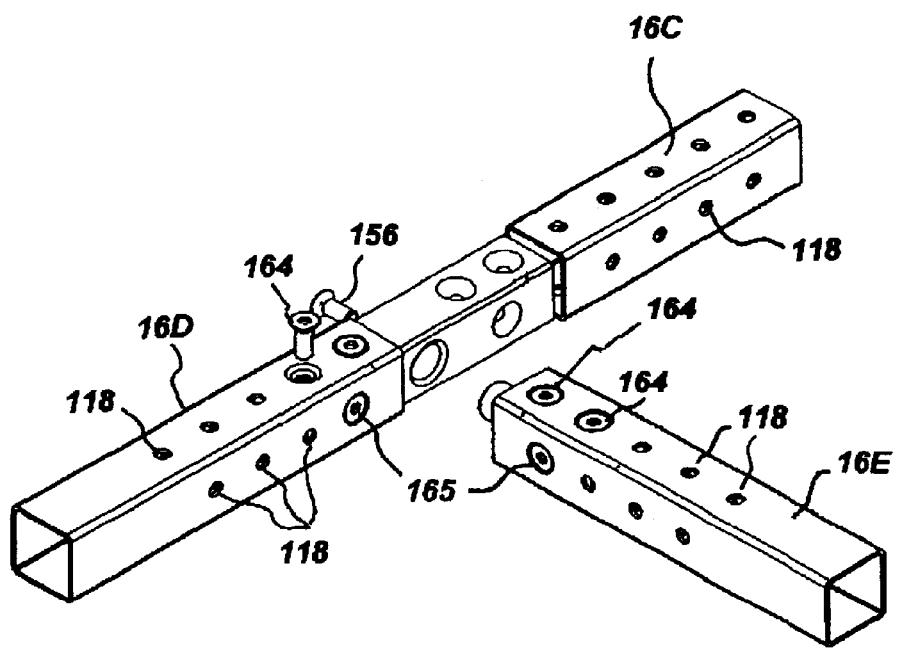
FIG. 12 is a perspective view of the assembly of FIG. 9 in association with respective tubular elements.
Figure 13:
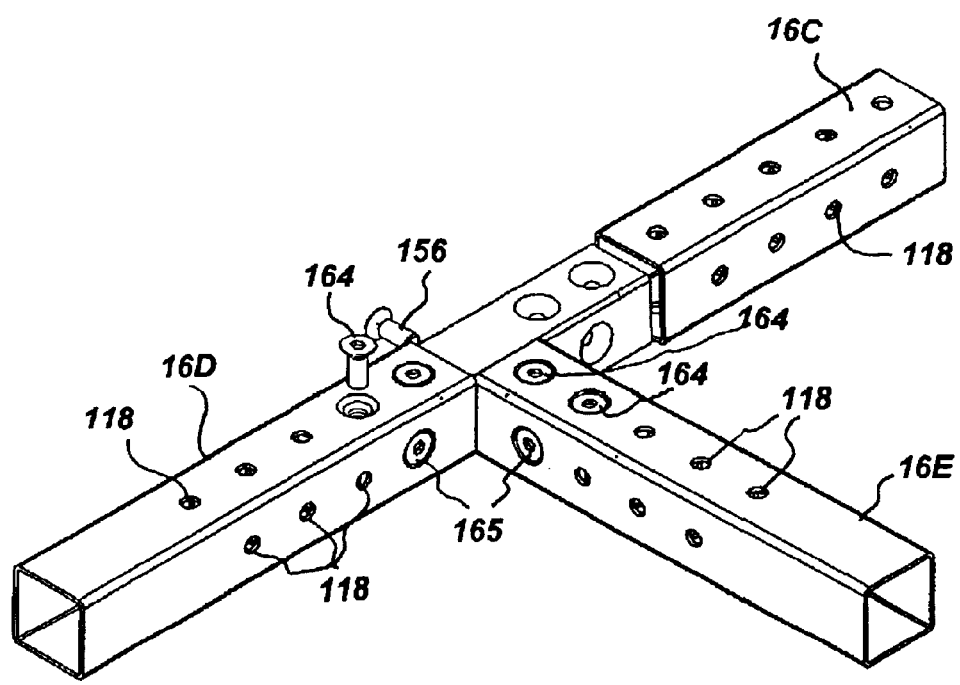
FIG. 13 is a perspective view of the assembly of FIG. 12 in a more assembled condition.

A third embodiment of the invention is illustrated in FIGS. 9–12. This embodiment is adapted to form a "T" shaped union of three tubular elements, 16C, 16D, and 16E as illustrated in FIG. 12. Such a "T" union is oftentimes utilized to form a reinforcement structure for a conventional rectangular frame construction.

Figure 9:
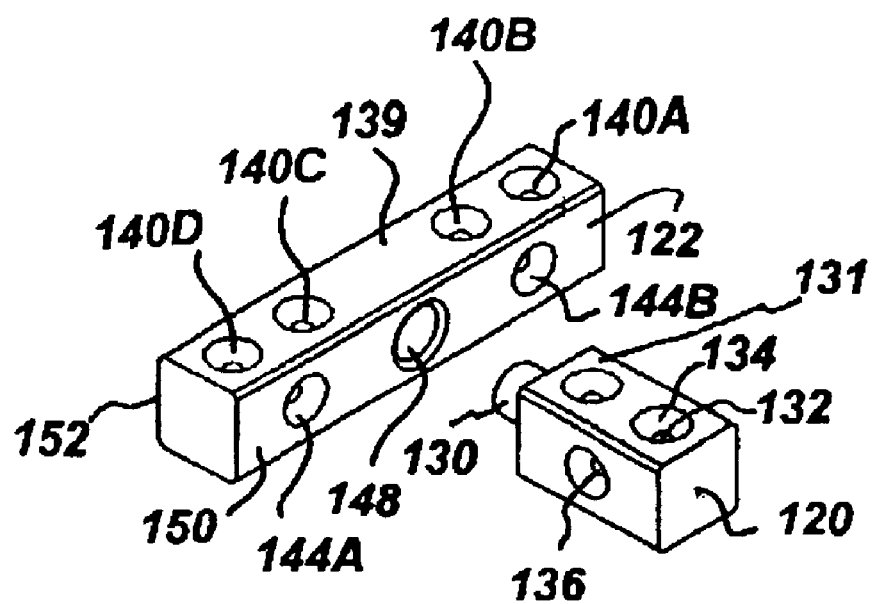
FIG. 9 is a perspective view of a third embodiment of the invention.
Figure 10:
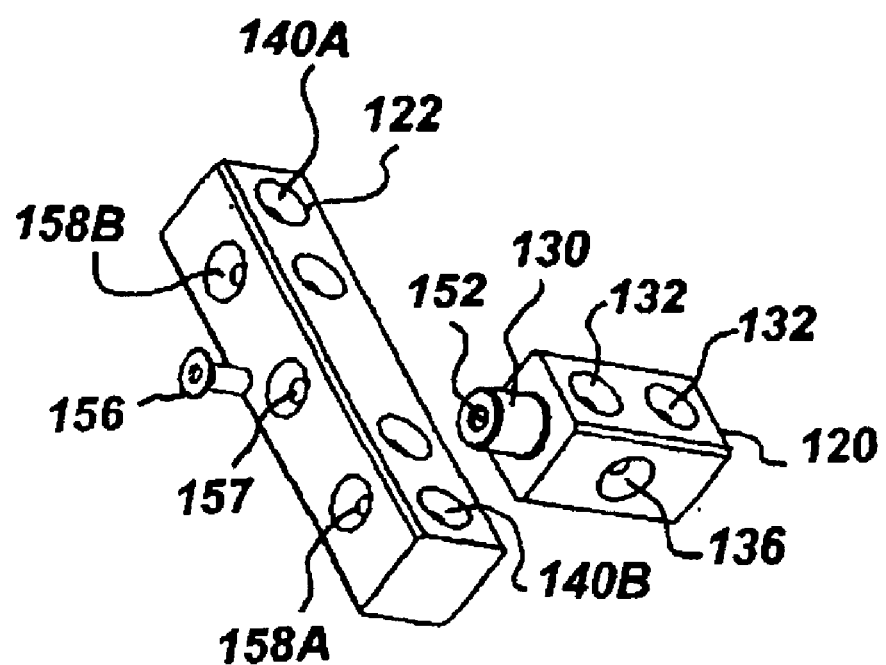
FIG. 10 is a further perspective view of the embodiment of FIG. 9.
Figure 11:
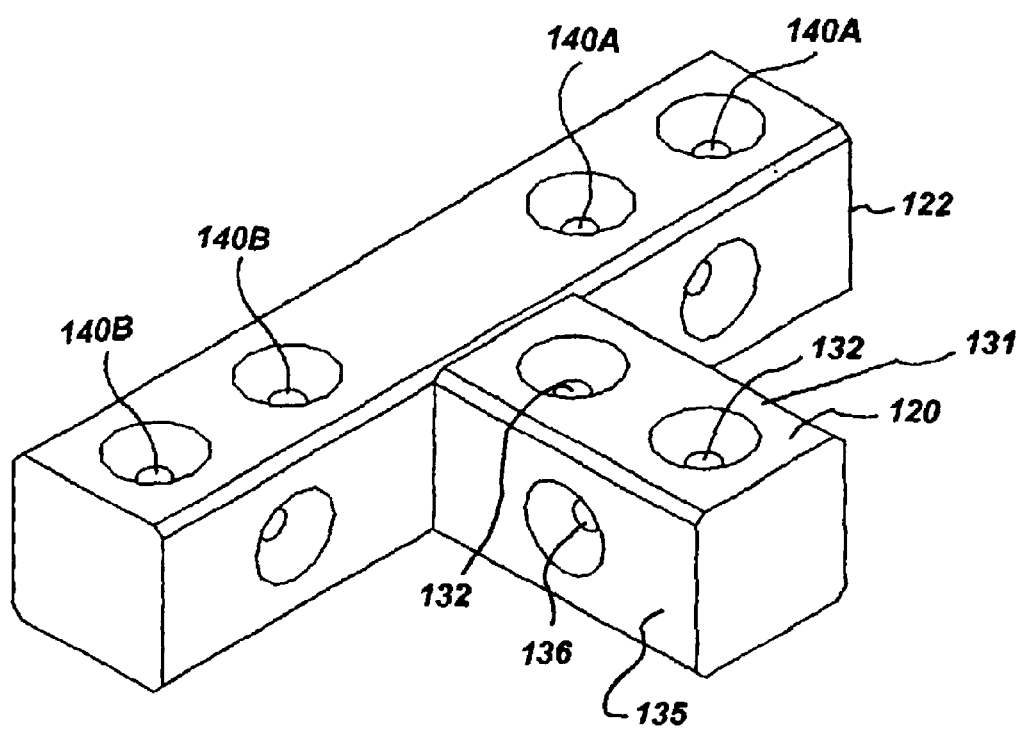
FIG. 11 is a perspective view of the inserts of FIG. 10 joined together.

This embodiment includes a first insert 120 which is configured essentially identical to the first insert 20 described above. The second insert 122 is modified from the second insert 22 described above. As shown in FIG. 9 the second insert 122 is an elongate member having a quadrilaterally configured cross section and four planar sides. As shown in FIG. 9 the side 150 defines at least two channels 144A and 144B. Similar to the channels previously described, these two channels have a countersunk region which intersects the planar surface of the side of the insert. The channel extends symmetrically from the countersunk region into the body of the insert along a linear longitudinal axis. Similarly the side 152 defines at least two channels 158A and 158B (FIG. 10) which each have a countersunk region which intersects the plane of the side of the insert with the remaining portion of the channel extending into the body of the insert 122.

On the upper surface 139 of the insert 122 four channels 140 are illustrated. Each of the channels 140 include a countersunk region in association with a remaining channel portion which is of constant diameter over its length. Positioned centrally in the body of the insert 122 is a channel 148 on surface 150 which is dimensioned to slidably receive the extension of the first insert 120. The side 152 of the second insert 122 defines a channel 157 (FIG. 10) which has a countersunk region proximate at its intersection with the surface 152. Similar to channel 58A and channel 48, the channels 157 and 148 are oriented in registration with one another whereby a connection member 156 may be inserted through the channel 157 and into channel 148 and thereafter into a channel 152 defined within the body of the extension to effect a union of the first insert 120 and the second insert 122 as shown in FIG. As further shown in FIG. 12 the two tubular elements 16C and 16D may be slid over a respective end of the second insert to align each of the channels 140B and 140A with a respective aperture 18.

As previously described with respect to the first embodiment, a connection member 164 is inserted into each of the apertures 118 which is aligned with a respective channel 140B or 140A. The connection member 164, which may be either a self tapping screw or alternatively a threaded bolt which is dimensioned to intercorporate with female threads formed on the interior sidewall of the respective channels 140A and 140B. Furthermore, the two tubular members 16C and 16D may be aligned to bring each of the channels 158A, 158B, 144A and 144B into registration with a respective aperture 118. A connection member 165 may then be inserted into each of the apertures 118 so aligned and thereafter into the counterpart channel 158A, 158B, 144A or 144B to form a threaded union of the tubular member with the second insert. Similarly, the third tubular member 16E may be slid into place about the first insert 120 to bring the channels 132 and 136 into registration with respective apertures 118. Thereafter connection members 164 and 165 may be inserted through the associated apertures 118 and channels 132 and 136.

Figure 6C:
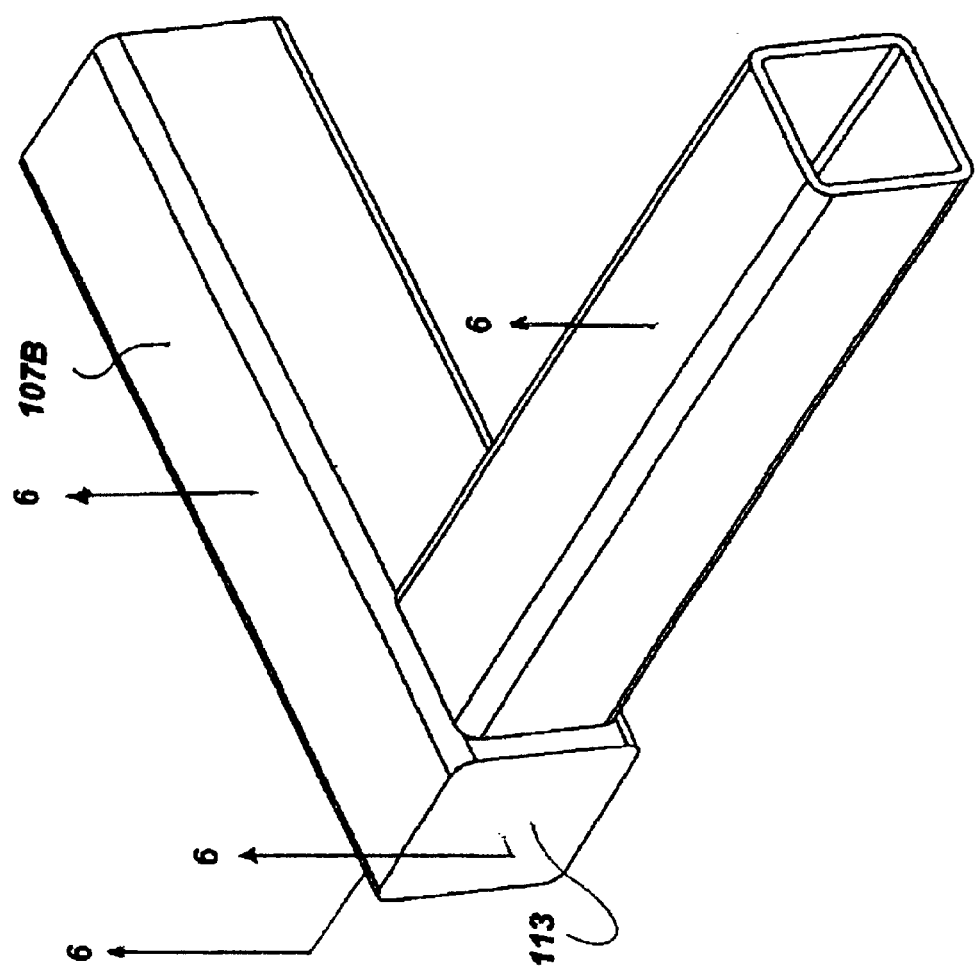
FIG. 6C is a perspective view of the association of FIG. 6 with the second plastic sheath in a fully installed condition.
Figure 6D:
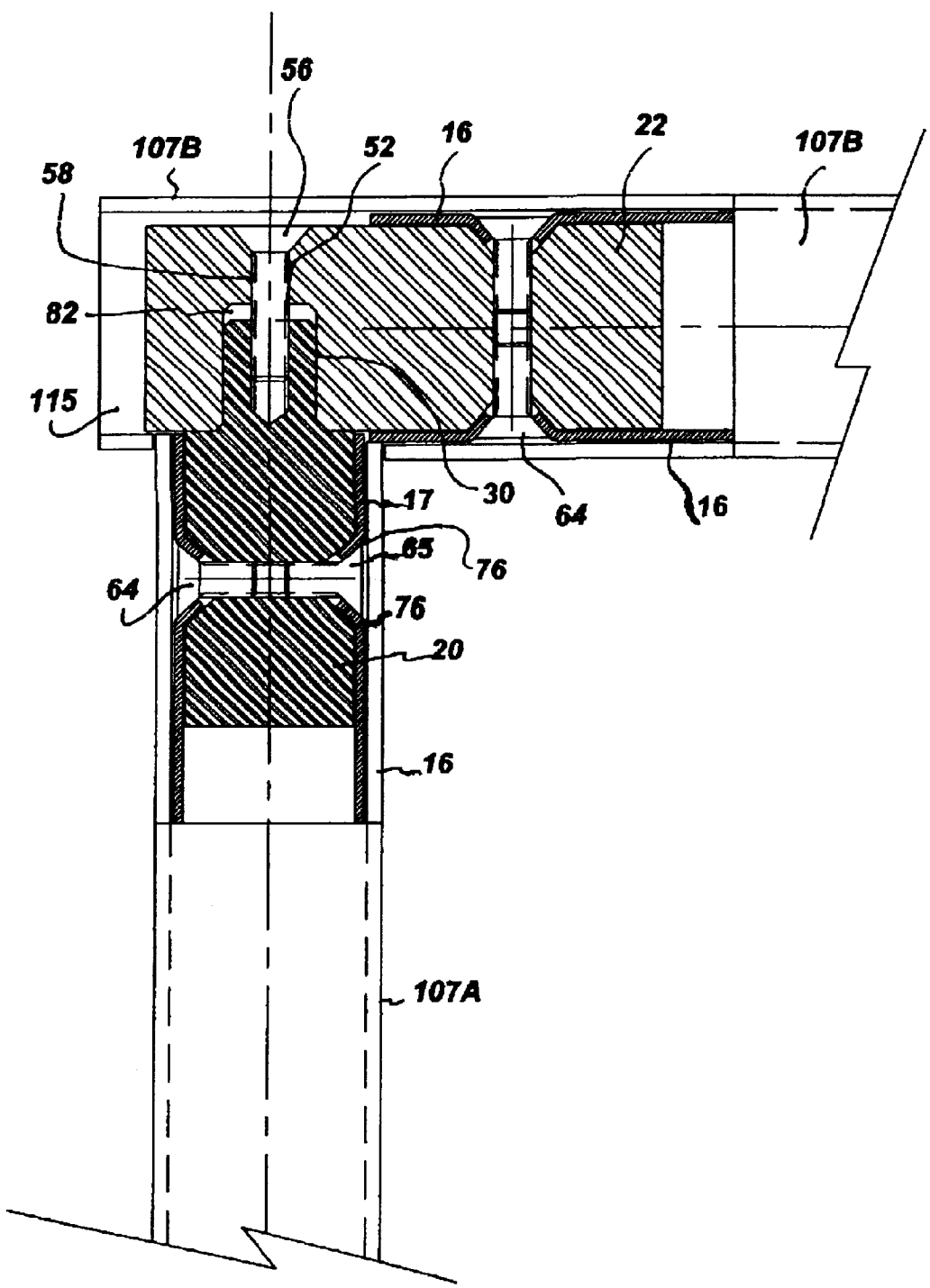
FIG. 6D is a cross sectional view of the association of FIG. 6C taken along section lines 6—6.

In those instances wherein the interconnection structure is used out of doors or demands a different cosmetic appearance, the user may wish to cover the tubular elements and portions of the inserts with a material which is resistant to the elements. In these instances, the tubular elements may be covered by a sheathing 107 fabricated from a weather resistant material, e.g., vinyl. To this end, a sheath 107 having a hollow interior channel dimensioned to slidably receive a tubular element may be provided. As shown in FIGS. 6–6D, prior to connecting the various tubular elements 16 together using the interconnection inserts 20 and 22, the inserts are positioned within the end of a respective tubular member 16. The various connection members 64, 65 are installed to interconnect the inserts to their respective tubular members 16, except for those connection members 56 which interconnect the pairs of inserts 20 and 22 together. The sheathing 107 may then be slid into place along each of the tubular elements 16 largely covering the inserts as well. As shown in FIGS. 6–6D, the sheath 107B defines an opening 111 which is configured to correspond to the end, i.e. the exterior cross section of the sheath 107A. The opening 111 communicates the environment with the interior channel of the sheath 107B.

The sheath 107B is slid along the length of its respective tubular member to align the center of the channel 48 with the center of the opening 111. Thereafter, the inserts 20 and 22 may be interconnected together by inserting the extension 30 into the channel 48. Thereafter, the connection member 56 is inserted into the channel 52 and threaded into the channel sufficiently to secure the first insert 20 to the second insert 22 thereby interconnecting the respective tubular elements one to another. Notably, the instant arrangement does not require the sheathing to be split. Thereafter, the sheath 107A is slid along the tubular element 17 sufficiently to insert the end of the sheath into the opening 111 thereby forming a union of the two sheaths 107A and 107B. The end 112 of the sheath 107B may be fitted with a cover plug 115 as shown in FIG. 6C. The sheaths 107 in association with the cap 115 form a complete covering of the frame structure which is now largely resistant to the environmental conditions.

The angled joint described above may be utilized to form structures of various configurations for a plurality of applications. This the illustrated embodiments depict a 90 degree angle corner joint, it should be appreciated that joints of other angle configurations are equally obtainable by altering the orientation of the channel 48 or the extension 30 relative to the longitudinal axis of its respective insert element. Furthermore, the orientation of the surface 37 of the insert 22 may also require adjustment to accommodate a different angled orientation of the two inserts relative to one another.

The present connection structure does not require welding. The present joint structure provides a means for aligning and interconnecting two tubular members which is more precise than that obtainable using conventional welding techniques. In contrast to the prior art structure described above, the instant frame may be disassembled and later reassembled should that be necessary for repair and maintenance. Furthermore, the present structure permits a sheathing, e.g., vinyl, to be positioned about substantially the entire structure without the need to splitting the sheathing. It follows that the function of the sheathing is maximized while forming an interconnection structure which offers few if any ungalvanized surfaces which may be subjected to rust.

The present invention may be embodied in other specific forms with departing from its spirit or essential characteristics. The described embodiments are to be considered in all respects only as illustrative and not restrictive. The scope of the invention is, therefore, indicated by the appended claims as interpreted in view of the foregoing description. All changes which come within the meaning and range of the equivalency of the claims are to be embraced within their scope.

What is claimed is:

1. A connection structure for interconnecting two tubular elements, said connection structure comprising:
   a first tubular element which defines a first internal void therein, said void communicating with the environment through a first port; said first tubular element having a first sidewall defining at least at least one first aperture therein; said first aperture having a first aperture diameter;
   a first insert element positioned within said first internal void, said first insert member defining at least one first channel therein oriented in registration with said first aperture;
   a first connection element positioned within said first aperture and said first channel to connect said first tubular element to said first insert element, said first channel having a first tubular diameter, said first tubular diameter being dimensionally larger than said first aperture diameter; and
   a second tubular element having connection structure forming a connection with said first insert;
   wherein a portion of said first tubular element proximate said first aperture is bent into said first channel, said portion of said first tubular element being disposed intermediate a sidewall defining said first channel and said connection element.

2. The connection structure of claim 1, wherein said first channel defines a plurality of female threads along its perimeter.

3. The connection structure of claim 1 wherein said first insert element defines a countersink shaped port which communicates said first channel with the environment.

4. The connection structure of claim 1, wherein said first insert element defines a plurality of first channels therein, each of said first channels having an associated second first channel oriented in registration therewith.

5. The connection structure of claim 1 wherein said first insert element defines a first auxiliary channel therein, said first auxiliary channel being disposed transverse to said first channel.

6. The connection structure of claim 5 wherein said first auxiliary channel is disposed orthogonal to said first channel.

7. The connection structure of claim 5 wherein said first auxiliary channel defines a plurality of female threads along its perimeter.

8. The connection structure of claim 1, further including a second tubular element and a second insert element, said second tubular element defining a second internal void therein which communicates with the environment through a second port said second insert element being disposed within said second void, said second insert element being interconnected to said first insert element.

9. The connection structure of claim 8, wherein said second tubular element has a second sidewall defining at least one second aperture therein; said second aperture having a second aperture diameter.

10. The connection structure of claim 9, wherein said second insert element defines at least one second channel therein oriented in registration with said second aperture said second channel having a second tubular diameter which is dimensionally larger than said second aperture diameter.

11. The connection structure of claim 10, further including a second connection element disposed with said second channel and said second aperture.

12. The connection structure of claim 8, wherein said first insert element defines a first auxiliary channel therein positioned transverse to said first channel, and said second insert element defines a second auxiliary channel therein positioned transverse to said second channel, wherein an interconnection member is positioned within said first auxiliary channel and said second auxiliary channel for interconnecting said first insert element with said second insert element.

13. The connection structure of claim 12, wherein said interconnecting member in a male threaded screw.

14. The connection structure of claim 12, wherein said first auxiliary channel defines a plurality of female threads along a sidewall of said first auxiliary element.

15. The connection structure of claim 1, further including a sheath positioned about said first tubular element.

16. The connection structure of claim 8, further including:
   a plurality of first tubular elements, each first tubular element having a first insert element positioned in said void defined in a first end thereof and a second insert element positioned in a void dividing a second end thereof;
   a plurality of second tubular elements, each second tubular element having a second insert element positioned in a void defined in a first end thereof and a first insert element in a second end thereof; and
   wherein each said first insert element of each said first tubular element is interconnected with a respective second insert element of a second tubular element, and each said second insert element of each said first tubular element is interconnected with a respective first insert element of a second tubular element to form a continuous structure.

17. The connection structure of claim 16, further including a sheathing disposed about at least one of said tubular elements.

18. The connection structure of claim 17, wherein said continuous structure is polygonal in configuration.

19. A connection structure for interconnecting three tubular elements, said connection structure comprising:
   a first tubular element defining a first internal void therein accessible through a first port, said first tubular element including a first sidewall which defines a first aperture having a first diameter;

a second tubular element defining a second internal void therein accessible through a second port; said second tubular element including a second sidewall which defines a second aperture having a second diameter;

a third tubular element defining a third internal void therein accessible through a third port; said third tubular element including a third sidewall which defines a third aperture having a third diameter;

an interconnection element having a first end, a second end and an extension, said first end being dimensioned to be received through said first port into said first void, said second end being dimensioned to be received through said second port into said second void and said extension being dimensioned to be received through said third port into said third void, said interconnection element defining a first channel positioned in registration with said first aperture, said first channel having a diameter which is dimensionally larger than said first diameter, a second channel positioned in registration with said second aperture, said second channel having a diameter which is dimensionally larger than said second diameter, and a third channel in registration with said third aperture, said third channel having a diameter which is dimensionally larger than said third diameter;

a first connection member disposed in said first aperture and said first channel for interconnecting said first tubular element to said interconnection element;

a second connection member disposed in said second aperture and said second channel for interconnecting said second tubular element to said interconnection element;

a third connection member disposed in said third aperture and said third channel for interconnecting said third tubular element to said interconnection element;

wherein a first portion of said first sidewall proximate said first aperture is bent into said first channel, said first portion being positioned intermediate said first connection member and a sidewall defining said first channel;

a second portion of said second sidewall proximate said second aperture is bent into said second channel, said second portion being positioned intermediate said second connection member and a sidewall defining said second channel; and a third portion of said third sidewall proximate said third aperture is bent into said third channel, said third portion being positioned intermediate said third connection member and a sidewall defining said third channel.

20. The connection structure of claim 1, wherein said first connection element has a tapered head.

* * * * *